Oct. 21, 1924.　　　　　　　　　　　　　　　　　　　　1,512,516
O. ALBERT
PAPER DUSTER
Filed Dec. 20, 1921
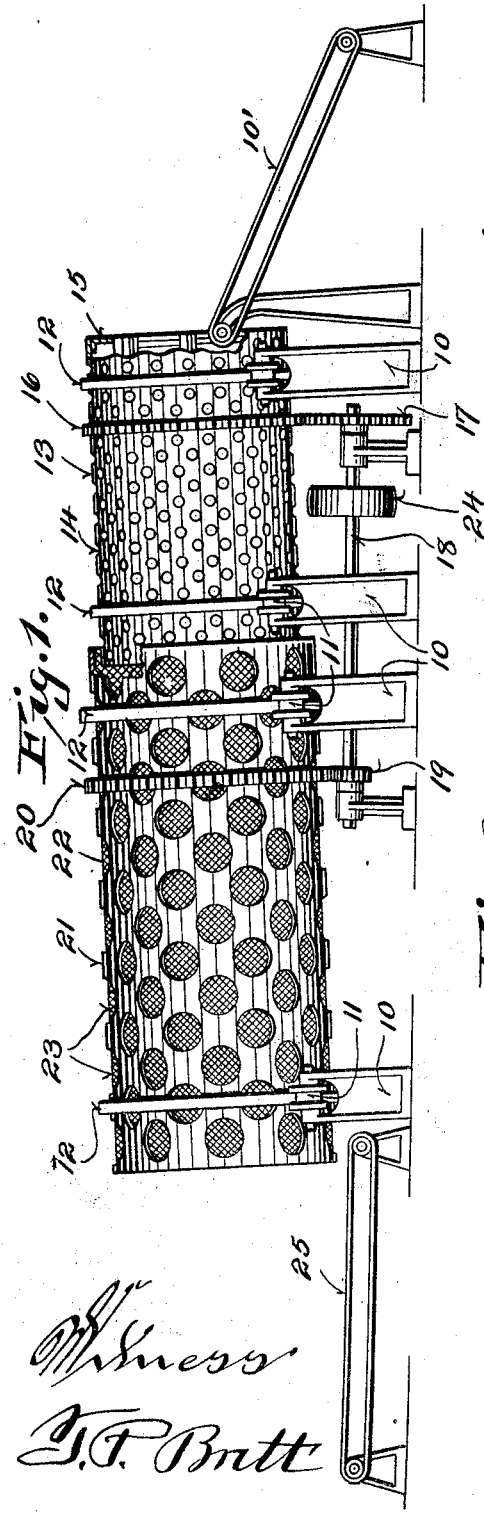
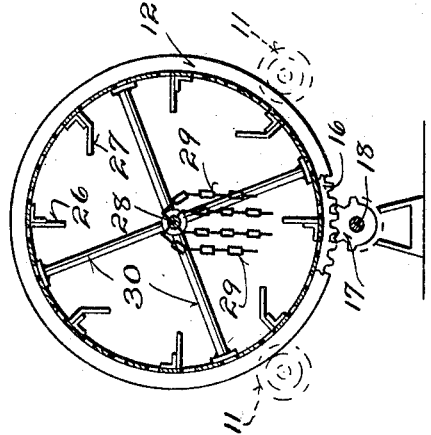
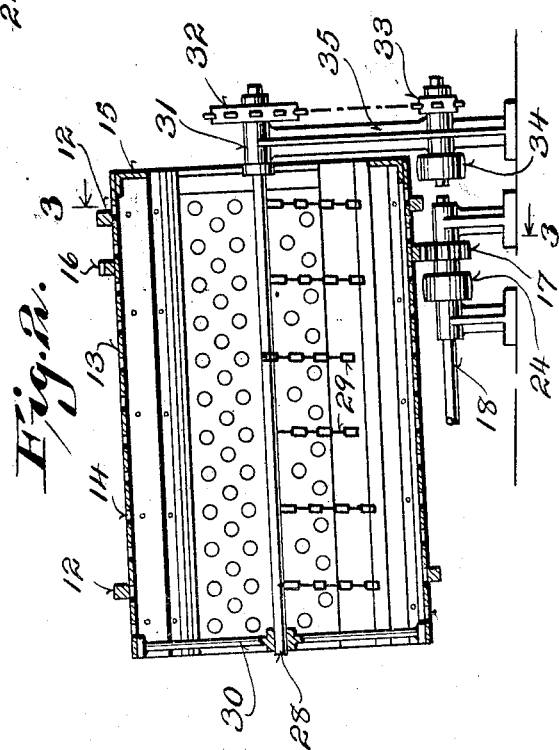
Inventor
Otto Albert Patented Oct. 21, 1924.

1,512,516

UNITED STATES PATENT OFFICE.

OTTO ALBERT, OF MILWAUKEE, WISCONSIN, ASSIGNOR TO GALLAND-HENNING MFG. CO., OF MILWAUKEE, WISCONSIN, A CORPORATION OF WISCONSIN.

PAPER DUSTER.

Application filed December 20, 1921. Serial No. 523,665.

*To all whom it may concern:*

Be it known that I, OTTO ALBERT, a citizen of the United States, and resident of Milwaukee, in the county of Milwaukee and State of Wisconsin, have invented certain new and useful Improvements in Paper Dusters; and I do hereby declare that the following is a full, clear, and exact description thereof.

My invention is designed to dust paper. It is directed especially to the provision of means for breaking up a bale of paper and means for then agitating the paper to remove foreign substances.

I provide a drum revolubly mounted and adapted to receive a bale of material.

Means are provided for breaking up the bale in the drum. The load is then fed into a similar concentric spring drum where the agitating of the paper continues and dust escapes through the screen. The contents are then discharged to be sorted.

Other objects and advantages will appear as the description proceeds.

Reference is had to the accompanying drawing; in which

Figure 1 is a side elevation.

Figure 2 is a central vertical section of the plate drum, and

Figure 3 is a cross section on the line 3—3 of Figure 2.

Supports 10 are provided with rollers 11 in the flanges of which riding rings 12 are adapted to travel. Plate drum 13 is provided with riding rings 12 and is apertured at 14 to permit the escape of dust. A gear 16 meshes with gear 17 rigid with shaft 18 on which gear 19 is mounted, meshing with gear 20. Screen drum 21 is apertured at 22 and is provided with screen 23 to permit the escape of air but prevent the paper from falling out. Rings 12 and gear 20 are rigid with screen drum 21. Plate drum 13 is concentric with and extends slightly within screen drum 21. Shaft 18 is provided with sheave 24 which receives power from a belt and transmits it to the shaft 18 to rotate the drums.

In the operation of the device, a bale is placed on conveyor 10' and drawn upwardly and deposited thereby in plate drum 13, which is rotated for breaking up the bale. An end plate 15 is provided for preventing the bale from falling out. During the breaking process, a certain amount of dust escapes.

The relative size of gears 19 and 17 indicates that the two drums are rotated at different speeds. Plate drum 13 may be revolved more rapidly. If it is desired, they may both be turned at the same speed by suitable gearing. After the breaking the paper travels into screen drum 21. This drum is designed to present the agitated paper to the action of air and permit the escape of dust through the meshes of the screen.

After the paper has been agitated, it is discharged to the sorting conveyor 25. If desired, a sorting table may be used or the drum may discharge into a chute. Plate drum 13 may be provided with longitudinal lifting blades 26, which may be directed straight out or which may be angled, as shown at 27. Any number of lifting blades may be used.

In addition to blades 26, means may be provided for breaking up the bale. A shaft 28 is provided with chains 29 and is mounted to revolve in spider 30 positioned in the lower end of drum 13. A support 31 is provided for the other end of shaft 28. Sprocket wheel 32 is rigid with the shaft and is operated by sprocket wheel 33, rotated by sheave 34 which gives direct power so as to rotate shaft 28 at a high speed. Instead of chains 29, prongs may be used or prongs may be inwardly directed in the manner of blades 26.

Supports 35 may be provided for shaft 28 so positioned as not to interfere with the introduction of the bales of paper which may be introduced to one side of the shaft while the drum 13 is downwardly inclined spider 30 having four divergent arms operates to prevent the premature egress of the bales.

It will be noted that the device is substantially automatic in its action and obviates the need of breaking up the bales separately before subjecting them to dusting process.

I claim:

1. The combination of a plate drum, a shaft therein, means for rotating said drum, blades on said drum projecting inwardly to grip and lift a bale of paper on the rotation of said drum, means for rotating said shaft and members on said shaft extending outwardly to strike said bale on the rotation of said shaft, the ends of said members being spaced from said drum a considerable distance.

2. The combination of a conveyor, a perforated drum positioned at the end of said conveyor for receiving material therefrom, means in said drum for breaking bales of material, a second screen drum concentric with and of slightly larger diameter than said first mentioned drum and freely revolvable relative to said first mentioned drum and means for rotating said drums.

3. In a machine for breaking bales of paper, the combination of an apertured plate drum having an inlet end and a discharge end and having inwardly extending projections, a shaft located within said drum and having members extending outwardly therefrom, means for rotating said drum, means for rotating said shaft at a high rate relatively to said drum, a screen drum communicating with the outlet of said plate drum, and means for rotating said screen drum.

In testimony that I claim the foregoing I have hereunto set my hand at Milwaukee, in the county of Milwaukee and State of Wisconsin.

OTTO ALBERT